United States Patent [19]

Winberg et al.

[11] 4,149,437
[45] Apr. 17, 1979

[54] ADJUSTABLE SPINDLE LINER

[75] Inventors: Paul N. Winberg, Fayetteville, N.Y.;
Alexander Harsuk, West Springfield, MA; Jerry M. Gould, Liverpool, N.Y.

[73] Assignee: Lipe-Rollway Corporation, Syracuse, N.Y.

[21] Appl. No.: 899,088

[22] Filed: Apr. 24, 1978

[51] Int. Cl.$^2$ ............................................. B23B 25/00
[52] U.S. Cl. ..................................................... 82/38 A
[58] Field of Search ......................................... 82/38 A

[56] References Cited

U.S. PATENT DOCUMENTS

| | | | |
|---|---|---|---|
| 3,927,585 | 12/1975 | Austin | 82/38 A |
| 4,058,036 | 11/1977 | Austin | 82/38 A |

FOREIGN PATENT DOCUMENTS 2354742  5/1975  Fed. Rep. of Germany ......... 82/38 A

*Primary Examiner*—Harrison L. Hinson
*Attorney, Agent, or Firm*—Bruns & Jenney

[57] ABSTRACT

An adjustable support liner for securely holding a workpiece centered in a machine tool that includes an elongated sleeve having a plurality of clamping units mounted therein capable of holding the work centered in the machine in an undistorted posture. Each clamping unit contains a ring-like body for encompassing the work that is formed of two hinged sections. Each section, in turn, has an axially extended jaw member depending outwardly therefrom and means to rotate the jaws between a fully opened and a fully closed position whereby a symmetrical centering pressure can be continually applied by the jaws over the entire working range of the apparatus.

15 Claims, 6 Drawing Figures

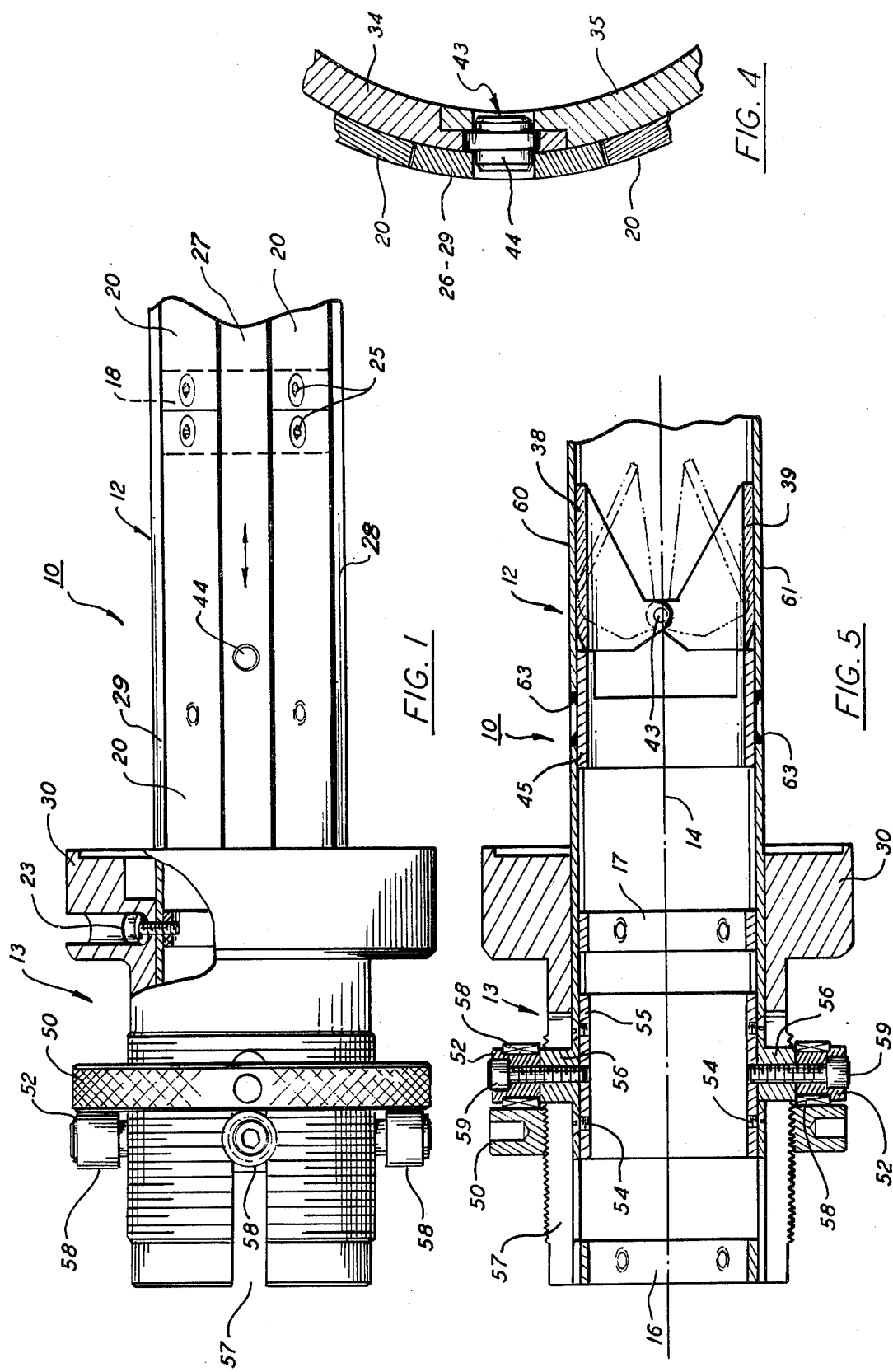

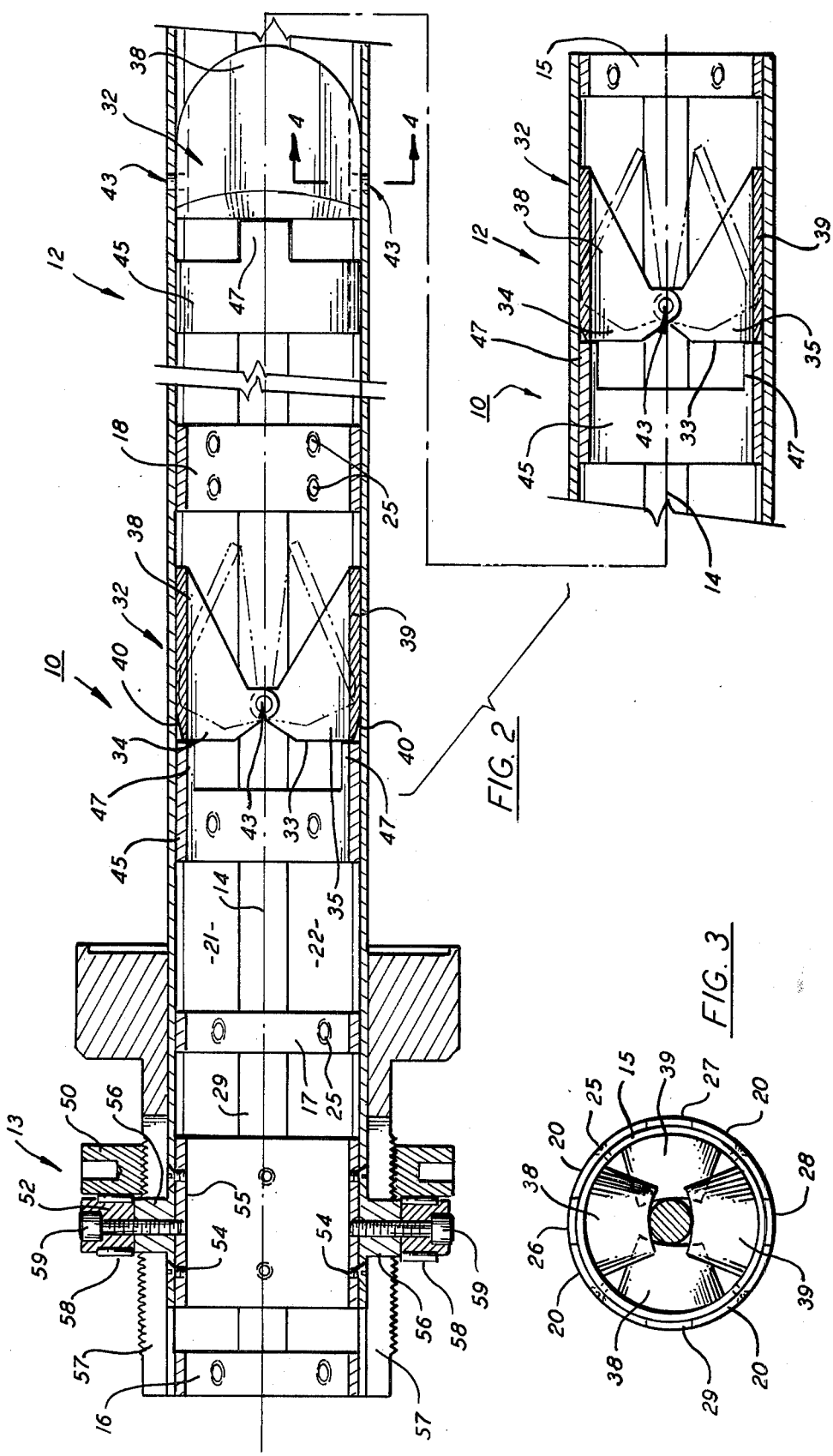

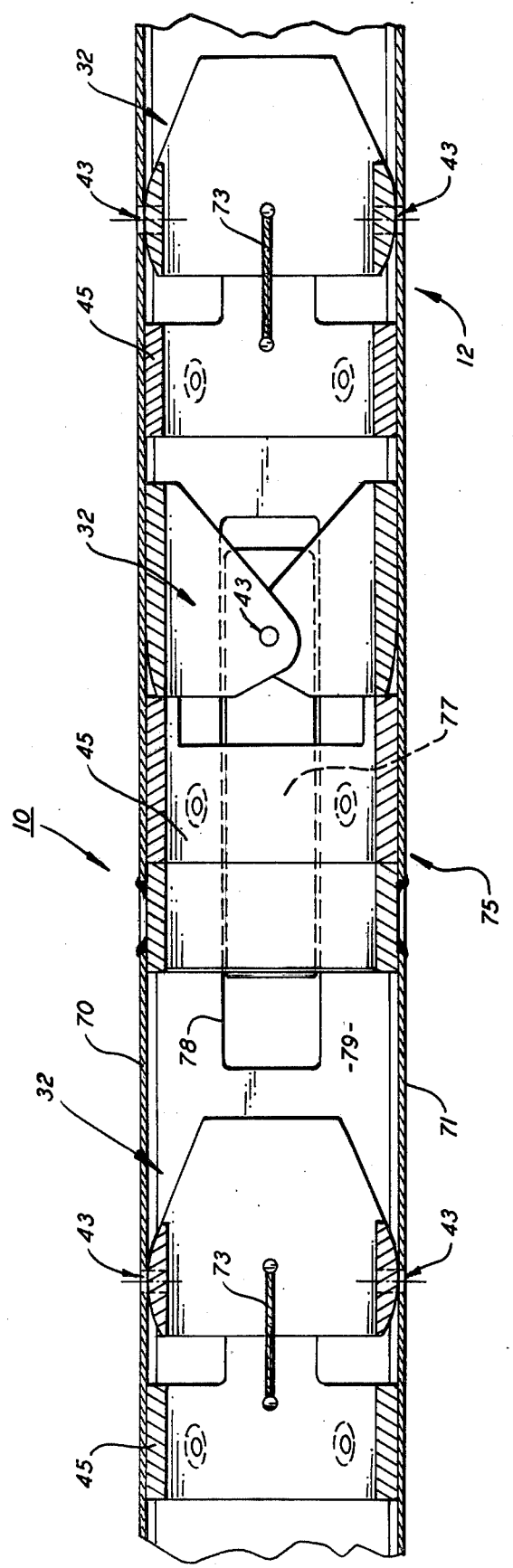

ADJUSTABLE SPINDLE LINER

BACKGROUND OF THE INVENTION

This invention relates to an adjustable liner for securely supporting elongated work elements centered within a machine tool in a relatively undistorted posture.

More specifically, this invention relates to a hollow liner, as typically utilized in a wide number of machine applications, for handling and feeding tubular or bar stock so that the axial centerline of the work remains concentrically aligned with the working centerline of the machine. In order to accommodate work elements of different sizes and shapes, as well as to allow the work to be fed through the machine, the liner is conventionally provided with one or more clamping devices which can be automatically opened and closed about the in process work to permit the desired machine operations to be carried out. Maintaining the work centered, while at the same time holding the work securely against the action of a tool or the like, has heretofore been a problem in the art.

One type of liner in use involves a collapsible sleeve containing a series of inwardly deformed sections that are adapted to collapse into holding contact against a workpiece contained within the sleeve. Actuation of the device is achieved by either applying a compressive force to both ends of the sleeve of sufficient magnitude to collapse the sections or by twisting the ends of the sleeve to achieve the same results. Although the collapsible sleeve has been shown to operate well in practice, it nevertheless is subject to material limitations in that the deforming and holding characteristics of the sleeve tend to change with usage. This type of liner is disclosed in U.S. Pat. No. 3,927,585.

In U.S. Pat. No. 4,058,036 an improved liner is disclosed in which a plurality of pivoted rings are mounted within an elongated sleeve so as to encompass a work element supported therein. In practice, the rings are rotated about their respective pivots so that the upper and lower rim surfaces, in regard to the pivot, bite into the work element to hold it in place. By mounting the pivots along a diameter of the sleeve, the work element is automatically centered under the influence of the clamping ring. However, because the two clamping surfaces of each ring are offset some distance in an axial direction, the rings tend to bend or otherwise crimp the work therebetween. As a consequence, the ring-like clamps can deform a slender or thin walled element thus rendering it unsuitable for use.

SUMMARY OF THE INVENTION

It is therefore an object of the present invention to improve liners suitable for use in supporting and centering a work element within the spindle of a machine tool.

Another object of the invention is to provide an adjustable liner capable of clamping slender or thin walled workpieces in an undistorted manner within the spindle of a machine tool.

A further object of the present invention is to improve spindle liners for clamping and feeding bar stock by providing a positive acting clamp mechanism which minimizes work distortion while at the same time delivering repeatable performance over innumerable cycles.

These and other objects of the present invention are attained by an adjustable support that includes an elongated sleeve containing a plurality of clamping units, each of which contain a two piece circular body having a pair of coacting axially extended jaw members depending outwardly therefrom. The two sections are hinged about the diameter of the sleeve and have a contoured working surface arranged to ride in rolling contact with the inner wall of the sleeve as the jaws move between a fully opened and a fully closed position whereby a workpiece supported therein is securely held in concentric alignment along the centerline of the sleeve. Actuating means are also provided to simultaneously and uniformly position the jaws of each clamping unit.

BRIEF DESCRIPTION OF THE DRAWINGS

For a better understanding of these and other objects of the invention reference is had to the following description of the invention which is to be read in conjunction with the following drawings wherein:

FIG. 1 is a partial side view of a liner embodying the teachings of the present invention;

FIG. 2 is a side sectional view of the liner shown in FIG. 1 further illustrating the clamping mechanism contained therein and means to actuate the clamping mechanism;

FIG. 3 is a right-hand end view of the liner shown in FIGS. 1 and 2 illustrating the clamping mechanism embracing a work element therein;

FIG. 4 is an enlarged section taken along lines 4—4 in FIG. 2 illustrating the pivot utilized in the individual clamping units;

FIG. 5 is a partial side elevation in section of a liner similar to that depicted in FIG. 1 showing a second embodiment of the invention, and FIG. 6 is a partial side view in section showing a still further embodiment of the invention.

DESCRIPTION OF THE INVENTION

Referring initially to FIGS. 1 and 2, there is shown a spindle liner, generally reference 10, that includes two main sections, an elongated sleeve 12 and an externally threaded head indicated at 13. The sleeve 12 is adapted to be slidably received within the spindle of a machine tool, filler tube or the like and is supported therein with the axial centerline 14 of the sleeve in concentric alignment with the working centerline of the receiving device. Means for so supporting the liner sleeve within a machine or the like are well known in the art and are not deemed part of the present invention.

The elongated sleeve contains two annular end supports 15,16 and a series of intermediate annular supports 17,18 located therebetween. Four arcuate shaped shell casings 20 are affixed to the annular supports via recessed flat head screws 25 as best shown in FIG. 3 to provide four parallely aligned longitudinal slots or guide ways in the sleeve structure. In assembly, the guide ways are equally spaced at 90° intervals about the circumference of the sleeve although they may take any suitable form. Four arcuate shaped slide members 26–29 are shown slidably mounted in the guides with the outer periphery of the slides complimenting the outside diameter of the sleeve whereby the entire assemblage creates a generally enclosed cylindrical element of hollow construction. The function of the slides shall be described in further detail below.

The left-hand end of the sleeve, as shown in the drawings, is inserted into an opening provided in the head 13 and secured therein by means of a series of circumferentially spaced cap screws 23 recessed into the mounting flange 30 of the head mechanism. The cap screws are arranged to threadably engage the shell casings and thus securely support the sleeve in canterlevered fashion within the head.

A plurality of clamping units, generally identified as 32, are located within the sleeve along the axial length of the outboard end thereof, that is, the unsupported end of the sleeve extending outwardly from the head. Each clamping unit includes a generally circular body 33 arranged to encompass a work element, such as a length of bar or tubular stock, operatively positioned within the sleeve. The body is made up of two semi-circular sections 34,35 that are hinged together by means of a pair of pivot pins or trunions 43. Depending outwardly from the two semi-circular sections are a pair of axially extended jaw members 38,39 that are adapted to move between a fully closed and a fully opened position as the sections swing about the trunions.

As best seen in FIG. 2, the outer periphery of each semi-circular clamp section is provided with a contoured working surface 40 that is adapted to move in rolling contact with the inner wall of the sleeve as the sections move about the trunions. In assembly, the clamping units are furnished with a close sliding fit in regard to the inner wall of the sleeve and the trunions are accurately located in coaxial alignment along the diameter of the sleeve. As a result, the jaws of the clamp have the ability to continually act uniformly between the sleeve and a work element embraced therein to deliver an extremely strong and positive holding force against the work.

Referring now to FIG. 4, in the main embodiment of the invention, the trunion 43, which rotatably support the hinged clamp sections, are also secured within one of the four slides movably mounted upon the sleeve. As illustrated, each trunion is supplied with an extended axle 44 that is press fitted or otherwise secured to the adjacent slide. In this arrangement, a pair of two opposed slides are employed to reposition a clamping unit axially within the sleeve as the slide pair is moved aong the appropriate guides.

Positioned within the sleeve on the upstream side of each unit, that is, the side away from the one containing the depending jaw members, is an actuating ring 45. It should be made clear at this point, that in practice an elongated work element is passed through the liner by inserting the element into the back or head end of the device. The jaw members associated with each clamping unit are thus mounted to point generally in the direction of work travel thereby preventing the work from hanging up or otherwise catching on the jaws. Each actuating ring is arranged to encompass the work to permit free movement thereof through the liner. The rings are secured in place by screws affixed to the sleeve casings. A pair of axially extended tabs 47 of equal length are arranged to contact the adjacent end face of each clamp section and to force the clamps to a closed position as the slides affixed thereto are pulled rearwardly toward the head end of the liner. The contacting surfaces of the tabs are maintained in radial alignment whereby the two hinged sections of the clamp are caused to move in unison about the trunions as the units are drawn rearwardly into operative contact therewith.

As shown in FIG. 2, the trunions associated with each adjacent unit are rotated about 90° in reference to the previous unit so that the coacting jaws of the unit move into the work in a direction that is substantially normal to those of an adjacent unit. As a result, the combined action of the jaws against the work exerts a symmetrical centering force about the entire periphery of the work. The associated actuating ring is also turned 90° with the clamping unit in order to properly control the motion of the jaws. In this particular embodiment of the invention two pair of opposed slides are thus required to actuate the clamping units in the series shown.

Clamp adjustment is furnished to the liner by means of a spanner nut 50 that is threaded onto the external threads of 52 that extend outwardly in a radial direction from each of the slide members. In assembly, the terminal ends of the slides are all secured, as by screws 54, to a tubular frame 55 slidably mounted within the sleeve. Each slide contains a radially extended pedestal 56 that is dependent thereon and which passes upwardly through one of the four longitudinal slotted holes 57 formed in the head. The posts have an annular groove machines therein in which is seated a bearing 58 adapted to ride in low friction contact against the side wall of the spanner nut. Each post is secured as shown in FIG. 2 to the slide pedestal by means of a socket head screw 59 and thus serves to rotatably secure the bearing in assembly.

In operation, the spanner nut is turned down toward the flanged end of the head thereby permitting the clamps to move to an opened position. A workpiece 60 (FIG. 3) is passed through the head end of the liner past the open jaws of the clamps into a desired operational position. The spanner nut is then moved on the threads rearwardly to push the posts, and thus the associated slides back whereupon the jaws are caused to close against the work. It should be noted that in this arrangement, the slides are all loaded in tension as the work is being clamped in place and, as a consequence, the slide members will not buckle or otherwise deform under load. It should be further noted that the jaws, because of the manner in which they are mounted, act uniformly and symmetrically to force the work element into concentric alignment with the working center of the machine. The spanner nut may be provided with a setscrew adapted to hold it in place when properly adjusted.

A second embodiment of the invention is illustrated in FIG. 5 wherein like elements, as described above, are depicted by like numerals. In this embodiment of the invention, the trunions 43 of each clamping unit are secured to the stationary shell casings of the sleeve to prevent the units from moving axially in assembly and the actuating rings are permitted to slide within the sleeve. A single pair of slides 60,61 are mounted in complimentary guides form in the sleeve as disclosed above and the slides secured to the actuating rings by means of welds 63 or any other suitable means.

Similarly, the posts associated with slides are positioned on the opposite side of the spanner nut. Moving the nut toward the flange end of the head thus causes the actuating rings to be pushed via the slides into jaw closing contact with the individual clamping units whereupon the work is secured within the liner as explained above.

A further embodiment of the invention is illustrated in FIG. 6 which provides for 90° rotation of each clamping unit while, at the same time, allowing the units to be actuated by a single pair of slides. This, in turn, will permit all the clamps to operate in unison and reduces the number of casing sections required thus establishing a more utilized and stronger assembly.

As shown in FIG. 6, the first and third clamping units 32 are identical to those described above in reference to FIG. 2. As previously noted, the trunions 43 associated with each clamping unit are rotatably secured in each of the opposed slides 70 and 71 in the manner depicted in FIG. 4. Accordingly, the jaws associated with each of the units 32 will be opened and closed as they are moved toward and away from the fixedly mounted actuating rings 45. A return cable 73 is secured by any suitable means at one end to the stationary ring and at the other to the jaw of the clamp. As can be seen, as the slides are moved forward to a jaw releasing position, the cables are pulled taut thereby exerting a lifting force on the jaws which causes them to open. Although not shown in the other embodiments of the invention, the return cable arrangement may be incorporated therein to better facilitate the movement of workpieces into and out of the liner.

Positioned between the first and third clamping units is an assembly 75 made up of a clamping unit 32, a stationary actuating ring 45 and a third offset ring 76. In this particular assembly, the position of the clamping unit is turned 90° in respect to the other two units so that the trunions of the clamp are in horizontal alignment rather than vertical alignment. The axles 44 (FIG. 4) of the two trunions extends outwardly from the body of the clamp and are pivotably mounted in opposed horizontal fingers 77.

Each finger 77 is slidably mounted within an elongated horizontal opening 78 formed by the two side casings 79 of the sleeve 12. As can be seen, the fingers extend rearwardly towards the head end of the liner and are supported in contiguous relationship with the outer walls of both the actuating ring and the offset ring. In assembly, the fingers are securely affixed to the offset ring as by welding thereby cojoining the ring and the clamping unit of the assembly. Slotted holes 80 are formed in each slide adjacent to the offset ring and a weld 81 placed therein to further secure the offset ring to the slides.

As should be apparent from the disclosure above, by the use of the described offset ring, the number of clamp drawing slides required per unit can be reduced while, at the same time, still preserving the advantages of loading the strips in tension during a work clamping sequence of operation. This, in turn, reduces the number of components required at the head end of the liner as well as reducing the complexity of the device. It should be further noted that by this arrangement the angular relationship between adjacent clamping units can be made to any desired angle and is not necessarily limited to 90°.

While the invention has been described with reference to the disclosure above, the invention is not confined to the details as herein set forth and this application is intended to cover any modifications or changes as may come within the scope of the following claims.

We claim:

1. An adjustable support for securely holding generally elongated workpieces of tubular and bar stock concentric with the working center of a machine tool including an elongated tubular sleeve that is mountable within a machine tool with the axial centerline of the sleeve being concentric with the working center of the machine, said sleeve being adapted to receive a workpiece therein, a plurality of annular clamping units mounted within the sleeve so as to encompass a workpiece received therein with each unit having a pair of cooperating jaw members hinged for rotation about a pivot means so that the jaws can move toward and away from each other to embrace a workpiece therebetween, a contoured working surface formed on the outer periphery of each jaw member that is arranged to make rolling contact with the inner wall of the sleeve as the jaw members move between a fully opened and a fully closed position about the pivot means, and actuating means operatively associated with each clamping unit having tabs mounted along the inner wall of the sleeve adapted to contact the jaw members, and an adjusting means for uniformly changing the relative axial positioning between said tabs and said jaw members whereby the size of the opening between the jaws is variable.

2. The support of claim 1 wherein the axis of rotation of each pivot means is aligned along the diametral centerline of the sleeve and the axis of rotation of each adjacent clamping unit is angularly offset from the previous unit.

3. The support of claim 2 wherein each jaw member is semi-circular in form and is adapted to seat in complimentary relationship against the inner wall of the sleeve when the jaws are in fully opened position.

4. The support of claim 3 wherein the pivot means comprises a pair of axially aligned trunions pivotably engaging each jaw member in a unit and being secured in the wall of the sleeve.

5. The support of claim 4 further including means to move the tabs uniformly in an axial direction toward and away from the jaw members to effect opening and closing thereof.

6. An adjustable support for securely holding a workpiece in concentric alignment with the working centerline of a machine tool including an elongated tubular sleeve that is mountable within a machine tool in axial alignment with the working centerline of the machine, said sleeve being adapted to pass a workpiece therethrough in one direction, a plurality of cylindrical clamping units slidably mounted within the sleeve to encompass a workpiece therein, said units including an annular body formed of two semi-circular sections pivotably joined along the diameter of the sleeve by a pair of trunions, each section further including an axially extending jaw member depending outwardly therefrom in the direction of work travel.

a stationary ring mounted with the sleeve, also arranged to encompass a workpiece, being positioned on the upstream side of each clamping unit in regard to the direction of work travel and having a pair of axially extended tabs adapted to contact the two body sections of said clamping unit, at least one strip slidably mounted within a longitudinal groove formed in the sleeve, said strip being secured to each of said clamping units, and adjusting means to pull said strip rearwardly in a direction opposite the direction of work travel to draw the slidable clamping units toward the stationary rings whereby the jaws are uniformly closed to securely support a workpiece therebetween in concentric alignment with the centerline of the machine tool.

7. The support of claim 6 wherein the body sections of each clamping unit each contain a contoured working surface arranged to make rolling contact with the inner wall of the sleeve as it rotates about the trunion.

8. The support of claim 7 wherein each clamping unit is pulled rearwardly by a diametrically opposed pair of strips secured to the trunions of each clamping unit.

9. The support of claim 8 wherein each adjacent clamping unit is angularly offset 90° in reference to the previous unit, and further including two pair of diametrically opposed strips with the first pair secured to the trunions of every other clamping unit and the second pair secured to the trunions of each clamping unit therebetween.

10. An adjustable support for securely holding a generally elongated workpiece of tubular or bar stock concentric with the working centerline of a machine tool including an elongated tubular sleeve mountable within a machine tool with the axial centerline of the sleeve concentric with the working centerline of the machine tool, said sleeve being adapted to pass a workpiece therethrough in one direction.

a plurality of cylindrical clamping units slidably mounted within the sleeve to encompass a workpiece contained therein, each unit including an annular body section formed of two generally symmetrical sections pivotably joined along the diameter of the sleeve by a pair of opposed trunions secured in the wall of the sleeve, each section further including an axially extending jaw member depending outwardly therefrom in the direction that the work passes through the sleeve, a movable ring positioned adjacent to each clamping unit on the side opposite the jaw members being arranged to encompass a workpiece and having a pair of axially extended tabs capable of contacting the two body sections of the clamping unit, at least one strip slidably mounted within a longitudinal groove formed in the sleeve, said strip being secured to each of the movable rings, and an adjusting means for positioning the strip within the groove to push the tabs toward the clamping units and thus effect closing the jaws against a workpiece and thus secure the workpiece in concentric alignment with the centerline of the machine tool.

11. The support of claim 10 wherein the body sections of each clamping unit each contains a contoured working surface thereon arranged to make rolling contact with the inner wall of the sleeve as the section rotates about the pivot.

12. The support of claim 10 including a pair of opposed strips mounted in the sleeve which are secured to each of the movable rings.

13. A clamp assembly for use in a cylindrical spindle liner for holding work centered therein including a clamping means having an annular body complimenting the interior of the liner being slidably mounted in said liner, said body being formed of two symmetrical sections pivotably joined by a pair of trunions with each section having an axially extended jaw whereby the jaws move toward and away from each other as they move about the trunion, an actuating ring affixed to the liner and being mounted therein adjacent to the clamping means on the side opposite said jaws and having means thereon for engaging said sections to move the jaws toward a closed position, an offset ring positioned adjacent the actuating ring, and being slidably mounted within said liner, having a pair of axially extended fingers affixed thereto which span the outside of the actuating ring and each finger rotatably supporting one of the trunions associated with the clamping means, means to axially reposition said offset ring within the liner whereby the clamp means is movable into engagement with the actuating means to close said jaws.

14. The clamp assembly of claim 12 having a return cable affixed to each of the jaw sections and the actuating ring to pull the jaws open as the clamp means move out of engagement with the actuating ring.

15. The clamp assembly of claim 13 wherein the fingers of the offset ring are carried in elongated openings formed in the side wall of the liner.

* * * * *

UNITED STATES PATENT AND TRADEMARK OFFICE
CERTIFICATE OF CORRECTION

PATENT NO. : 4,149,437

DATED : April 17, 1979

INVENTOR(S) : PAUL N. WINBERG; ALEXANDER HARSHUK, & JERRY M. GOULD

It is certified that error appears in the above-identified patent and that said Letters Patent are hereby corrected as shown below:

Under the heading "Inventors" the second named inventor's name was misspelled. Please change "HARSUK" to -- HARSHUK --.

Col. 4, line 10, after "threads of" insert the following -- the head. The nut acts against four identical control posts --.

Col. 4, line 18, "machines" should be -- machined --.

Col. 4, line 68, "utilized" should be --unitized --.

Claim 14, "claim 12" should be -- claim 13 --.

Signed and Sealed this

Thirty-first Day of July 1979

[SEAL]

Attest:

*Attesting Officer*

LUTRELLE F. PARKER
*Acting Commissioner of Patents and Trademarks*